June 22, 1954     S. S. GREEN     2,681,835
MAGNETIC BEARING FOR METERS
Filed Feb. 23, 1949
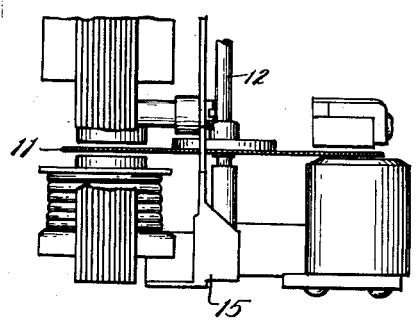
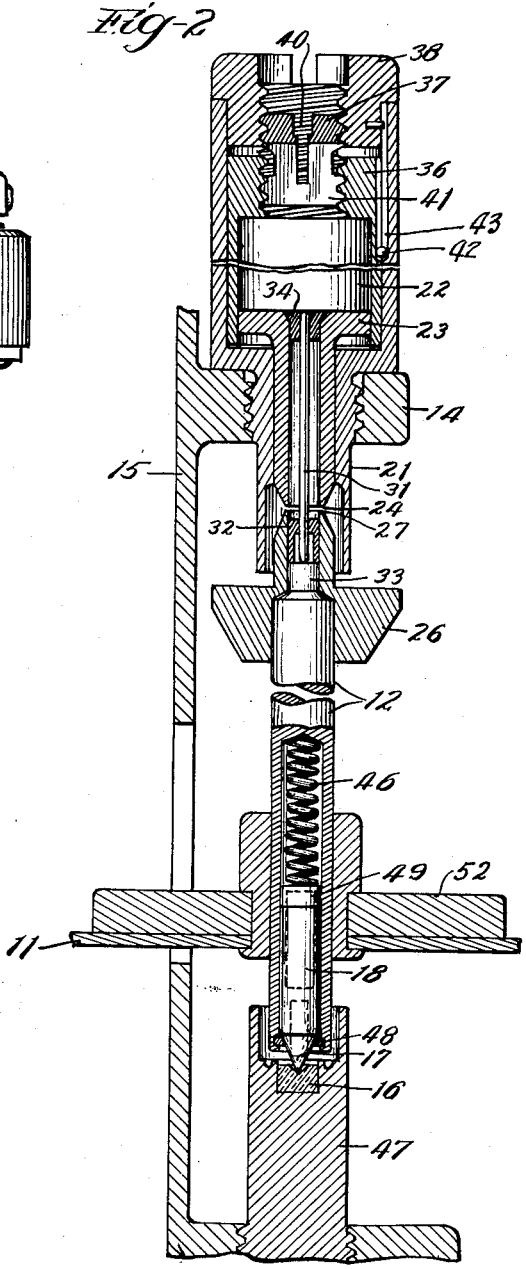
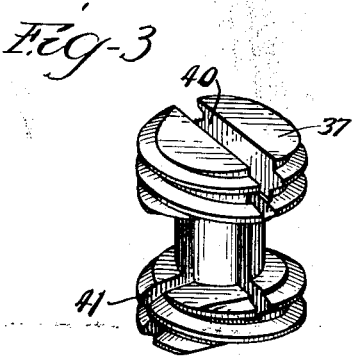
Inventor
Stanley S. Green
By Louis Robertson, Atty.

Patented June 22, 1954

2,681,835

UNITED STATES PATENT OFFICE 2,681,835

MAGNETIC BEARING FOR METERS

Stanley S. Green, New Bedford, Mass., assignor to Duncan Electric Manufacturing Company, Lafayette, Ind., a corporation of Illinois Application February 23, 1949, Serial No. 77,879

11 Claims. (Cl. 308—1)

The possible advantages which would result from the use of magnetic bearings have long been recognized. Numerous patents involving magnetic bearings have been issued and some structures have appeared on the market embodying such bearings. In my prior patent, No. 2,333,647, I disclosed a relatively simple but effective form of bearing in which the load of the rotating element was magnetically lightened. The present invention might be deemed an improvement on the invention of this prior patent, although in some of its aspects it is capable of wide use.

In the large scale commercial production of devices in which the load of a rotating part is magnetically lightened but not equalized, the spacing between the magnetic parts is quite critical. Very close spacing is desirable for good lateral stability and so as to make efficient use of the permanent magnet in order that a small permanent magnet may be sufficient. With close spacing a very small change in spacing produces a substantial change in the magnetic attraction. Hence it is important to adjust or design the spacing accurately to give the desired amount of load support, but it is also important to prevent excessive reduction of this small spacing, as this would completely overcome the force of gravity and draw the moving element upwardly. The present invention provides a practical construction for accomplishing all of this on a commercial scale.

The present invention also takes advantage of the load lightening effects of the magnetic bearing by adding weight to the rotating element in a position where it will reduce vibration, and by using a type of friction bearing which would not be desired with an element exerting the customary downward thrust on the friction bearing. The friction bearing in turn cooperates to improve the function of the magnetic bearing by contributing greater stability thereto and to the rotating element.

Additional objects and advantages of the invention will be apparent from the following description and from the drawings in which:

Figure 1 is a fragmentary view of a watthour meter measuring element.

Fig. 2 is a vertical cross-sectional view, partly broken away, through a meter frame and rotating disk structure, showing particularly the upper and lower bearings.

Fig. 3 is a perspective view of a screw shown in Fig. 2.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The invention has been illustrated in connection with a rotatable disk 11 such as is used commonly in watthour meters. The disk 11 is carried by a shaft 12 provided with a worm for driving the meter mechanism. The rotatable element comprising these parts is rotatably carried by a frame 15 provided with bearing brackets 14.

The rotatable element rests on a lower bearing comprising a jewel 16 which may be of glass or synthetic sapphire, and a pivot 17 which preferably is carried by a resiliently mounted holder 18 in the bottom of shaft 12.

Magnetic upper bearing

The magnetic upper bearing includes a bearing holder 21 which screws into upper bracket 14 on the meter frame. Within this bearing holder is carried a permanent magnet 22 having its lower pole face in engagement with an annular iron pole piece 23 terminating with an annular pole face 24.

The meter disk in turn is provided with an iron pole piece 26 pressed onto the upper end of shaft 12 and having at its top an annular gap or pole face 27 which is magnetically attracted by the gap face or pole face 24.

The gap length between gap faces 24 and 27 is preferably as small as .005 inch. The provision of such a small gap in large-scale commercial production introduces various problems. There are so many variables in the mounting of the meter shaft and the upper stationary bearing assembly that there must be special provision for securing such a high degree of accuracy on a large commercial scale without terrific expense. In spite of the difficulties, the short gap length is extremely desirable. For a longer gap length a stronger permanent magnet would be required. More important still, however, is the fact that the short gap length has a better centering effect on the rotating part. Present estimates indicate that with the annular gap shown with the gap length of .005 inch, a pole face width on one side of .003 inch and a 30 gram lift, a displacement of the gap face 27 from its centered position of only .001 inch will produce a centering pull of at least 5 grams. This is important because although a pin 31 and bearing bushing 32 have been provided, it is much preferred that under ordinary conditions they stay out of contact with one another. A clearance of .003 inch between the pin 31 and the bushing 32, all around the pin is provided (total diametric clearance being .006). If the magnetic centering effect can keep the bushing out of contact with the pin, friction and wear are avoided as well as some possibility of noise.

When the gap is as short as .005 inch it is important not to let it become much shorter by upward movement of the rotating element lest the rotating element freeze in its upper position. In other words, if the magnetic attraction is such that, with a gap of .005 inch the rotating element is almost supported, its weight might be entirely overcome with a gap of .003 inch. Then gravity alone would never be able to draw the rotating element back down to its proper operating position. According to the present invention, excessive upward movement of the rotating element is prevented by a very small clearance between limiter pin 31 and spacer or stop 33, at least one of which is non-magnetic. This clearance is preferably about .001 inch.

According to the present invention these various small clearances are provided with an extremely high degree of dependability without any great difficulty. The block 33 is pressed into the neck of cap 26 until it is spaced a predetermined distance below gap face 27. This can be controlled with extreme accuracy and uniformity by a suitable fixture. Likewise, a suitable fixture can position the pin 31 with its lower tip an exact predetermined distance below the pole face 24. Preferably the pin 31 is secured permanently in this position by allowing solder 34 to congeal while the pin is thus held. The holding fixture would also serve to center the pin with respect to the pole face 24.

It is now merely necessary to provide some delicate vertical adjustment for the pole piece 23 together with the pin 31. They are moved downwardly until the pin 31 strikes the top face of block 33 and then backed away .001 inch. This automatically provides the clearance of .001 inch. The predetermined accurate spacing of the tip of pin 31 below pole face 24 having been .004 inch greater than the predetermined accurate spacing of block 33 below gap face 27, the desired gap length of .005 inch inevitably appears when the pin 31, together with pole piece 23, has been backed away .001 inch.

The construction at present preferred for providing this delicate vertical adjustment is clearly indicated in Fig. 2. The magnet 22 and pole piece 23 are jointly carried by a carriage or sleeve 36 which is vertically movable in holder 21. A screw 37 has a differential threaded engagement with sleeve 36 and a cap 38 for moving the carriage 36 up and down, the cap 38 being rigid with the holder 21 as by means of a tight press fit. In the illustrated form of the invention the threads formed in sleeve 36 are slightly coarser than those formed in cap 38, and the threads of screw 37 are intermediate, being cut away except for the top and bottom two threads. Transverse slots 40 and 41 at right angles to one another extend respectively from the top and bottom far enough to cause the threads to press resiliently against the threads of sleeve 37 and cap 38. This, together with the "binding" of the different thread sizes, eliminates backlash. The differential screw action gives a very delicate adjustment so that after turning screw 37 until pin 31 touches block 33, a one-third reverse turn will provide the desired .001 inch clearance and .005 gap length.

Differential screw devices used in other connections heretofore have used different thread pitches on the two ends of the screw, increasing the cost of manufacture The screw 37 may be made at low cost on automatic screw machines.

Contact between the pin 31 and block 33 can easily be determined either by feel or by applying a light load to the meter during the adjustment so that the disk rotates until pin 31 bears on block 33 and is then retarded by the friction of this contact. Other screw devices can be used, but to facilitate the desired adjustment one turn should move the sleeve 36 less than .01 inch, preferably not more than .004, or four times the clearance desired.

The magnet 22 and pole piece 23 may be held in the carriage 36 by a press fit, by a fillet of solder, or both. Rotation of sleeve 36 is prevented by a key such as a spline, or, as illustrated, a ball 42 in cooperating slots 43.

The pole face 24 should of course be free from any lateral play with respect to the neck of holder 21. This can be accomplished merely by commercial machining of the pole piece 23 to have a rubbing snug fit with the bore through holder 21. Of course the fit should not be tight enough to interfere with the vertical movement under influence of screw 37.

*Lower bearing construction*

Damage to the lower bearing due to impact can be avoided by principles taught in my copending application, Serial No. 488,493, filed May 26, 1943 (Patent No. 2,471,618 issued May 31, 1949). However, for best results from the use of the magnetic upper bearing some changes are made.

It is still preferred that the pivot 17 be of a non-corrosive alloy as taught in my Patent No. 2,203,411, for the various reasons there explained. However, because of the lightened load normally on the bearing (resulting from the magnetic partial support), and because of the yieldable mounting of one of the bearing elements, it is now practical to use a pointed tip on the pivot 17. Furthermore, it is desirable to use a jewel 16 having its bearing surface V-shaped in cross-section with fairly steep sides so that the pivot 17 will stay centered in spite of the light apparent weight of the movable element. The pointed pivot 17 is made practical in spite of using a non-corrosive metal by mounting the pivot on the rotating element and the jewel below it. The rotation of the pivot provides a self-sharpening effect thereon. The non-corrosive metal, although a fairly hard metal, is relatively much softer than some hardened steels, for example. Although this softness introduces some problems, it has various advantages. It tends to prevent breakage of the jewel 16 even if the glass is used in this jewel. It avoids abrasion of the jewel 16 because no hard oxide is formed on the surface of the pivot or debris therefrom.

The non-corrosive pivot 17 may be in the form of a wire insert in a pivot plunger or holder 18 which is slidable in shaft 12, being pressed downwardly therein by a spring 46. The spring 46 is of a strength considerably in excess of that required to support the moving element as the latter is lightened magnetically. Furthermore, it must be strong enough to reliably press the moving element upwardly when it has been jolted downwardly and the magnetic gap length greatly increased. At present I prefer a spring pressure about 15 grams more than the part of the weight of the moving element not supported magnetically, the element being restricted in downward movement so that the magnetic lift will not be decreased more than 10 grams.

The pivot plunger 18 is preferably hollow to reduce its mass (weight) because it is the inertia or momentum of this element which primarily determines the severity of impact between pivot 17 and jewel 16. The spring 46 can cushion everything except the portion of the impact due to the mass of pivot plunger 18.

The spring 46 should be long enough to permit the pivot plunger 18 to yield until the shaft 12 comes in contact with the metal portions of holder 47 so that even in the event of very severe jolts the jewel 16 will not be damaged.

As taught in my prior copending application, Serial No. 488,493 (Patents No. 2,471,618 issued May 31, 1949), the relationship between plunger 18 and shaft 12 should be such as to reliably center the pivot 17. To this end there should be a steep V-type of engagement between the plunger 18 and its seat 48, and this engagement should be close as practical to the tip of pivot 17. The plunger 18 at its far or upper end should have only slight clearance with the bore of shaft 12, this slight clearance being provided by an enlargement 49 on bearing plunger 18.

According to another feature of the invention, the jewel 16 and the pivot 17 are protected by adding more weight to the rotating element. In view of the fact that more weight would seem to increase the danger to the pivot and the jewel, an explanation of how more weight can protect them seems necessary. The fact that the magnet partially supports the weight is only a minor part of the story, although that is a very important factor from the standpoint of reducing the normal rotational friction. The use of the non-corrosive pivot prevents damage from rotational friction. Damage therefore would result only from impact. In view of the fact that one of the bearing elements is spring mounted, the severity of impact depends not on the impact momentum of the moving element, but on the steepness of the impact wave front. The steepness of the wave front is important because that determines how much of a blow can be delivered by or to a sprung bearing element of a given very small weight.

The added weight or mass of the rotating element does not increase the steepness of the wave front resulting from mechanical jars. It decreases the steepness of the wave front resulting from electrical disturbance, such as a short circuit. Hence the added weight at no time causes more impact damage, but in the case of electrical jolts it decreases the damage or likelihood of damage to the same extent that the weight is increased. At the present time it is preferred to add about 20 grams to the weight of the rotating element. This more than doubles the weight and therefore better than halves the steepness of the wave front characterizing eletrical impacts. This is especially important with forms of the invention in which one of the impacting bearing elements is spring-mounted and the other is rigid with the shaft so that the full speed of the jolt is always transmitted through it.

Preferably, two or three grams of the added weight is added at the top of the shaft for the purpose of reducing the tendency toward vibration at this point. The weight may be in the form of an annular enlargement 26 of the magnetic cap. This will also improve the magnetic characteristics. The remainder of the weight may be in the form of a ring 52 adjacent the disk. Alternatively, the shaft could be made heavier.

Defined weight quotient

Any weight added to or built into the rotating element for the purpose of increasing the ratio of mass to electroinductive jolting force utilizes this aspect of the present invention, if there is a yieldable jewel and preferably magnetic reduction of bearing pressure. The term "defined weight quotient" is used herein to mean the quotient of the actual total rotating mass divided by the mass of a solid aluminum disk having the torque characteristics of the disk actually used in the meter. Any meter capable of electroinductively producing jolts of its moving elements against a bearing and having a defined weight quotient of over 1.55 and using a spring in the mounting to protect the bearing utilizes the present invention to some degree. For a more significant gain a defined weight quotient of at least 2.0 is preferred. The disk suggested above would have a defined weight quotient of about 2.7.

From the foregoing it is seen that a magnetic bearing combination is provided in which friction and wear are reduced by largely supporting the rotating element magnetically and centering its upper end magnetically. Although small gaps are provided and must be accurate, a construction is provided which avoids any severe difficulties in large-scale commercial production.

I claim:

1. A magnetic-pull bearing comprising opposed magnetic units having narrow opposed annular faces forming a gap therein, one of said units including a permanent magnet, one of said units being stationarily supported and the other being carried by a rotatable element, a free-ended axially extending pin carried by one of the units, a stop member carried by the other of the units positioned to engage the pin and limit the approach of one of the faces toward the other, said pin and stop member each comprising a separate piece accurately and predeterminedly positioned with respect to its associated gap face, and at least one of the units being positioned by threads free from backlash during movement so that the pin and stop member may readily be moved into contact and then backed away for the desired clearance and the desired gap length.

2. A magnetic-pull bearing comprising opposed magnetic units having narrow opposed annular faces forming a gap therein, one of said units including a permanent magnet, one of said units being stationarily supported and the other being carried by a rotatable element, a free-ended axially extending pin carried by one of the units, a stop member carried by the other of the units positioned to engage the pin and limit the approach of one of the faces toward the other, said pin and stop member each comprising a separate piece accurately and predeterminedly positioned with respect to its associated gap face, and at least one of the units being positioned by a threaded device free from backlash during movement and moving the unit less than .01 inch per revolution so that the pin and stop member may readily be moved into contact and then backed away for the desired clearance and the desired gap length.

3. A magnetic-pull bearing comprising opposed magnetic units having narrow opposed faces forming a gap therein, one of said units including a permanent magnet, one of said units being stationarily supported and the other being carried by a rotatable element, a free-ended axially extending limiter carried by one of the units, a stop member carried by the other of the units positioned to engage the limiter and limit the approach of one of the faces toward the other, said limiter and stop member each comprising a separate piece accurately and predeterminedly positioned with respect to its associated gap face, and at least one of the units being positioned by a threaded device free from backlash during movement and moving the unit less than .01 inch per revolution so that the limiter and stop member may readily be moved into contact and then backed away for the desired clearance and the desired gap length.

4. A differential screw mechanism comprising a screw having threads along spaced zones, said threads being of the same thread characteristics including pitch so that they may be cut in one thread-cutting operation, a base member threadedly engaging the threads of one of said zones and a movable member threadedly engaging the threads of the other of said zones, one of said members having a thread pitch slightly greater than the threads of the screws and the other of said members having thread pitch slightly less than the threads of the screw, and said screw being split independently along each zone and having a set causing it to engage each of said members with resilient pressure, the threads of the respective parts coacting with a wedge-like action to eliminate backlash.

5. A differential screw mechanism comprising a screw having threads along spaced zones, said threads being of the same thread characteristics including pitch so that they may be cut in one thread-cutting operation, a base member threadedly engaging the threads of one of said zones and a movable member threadedly engaging the threads of the other of said zones, one of said members having a thread pitch slightly greater than the other of said members and both of their thread pitches being close enough to that of the screw to threadedly cooperate therewith, and said screw being split independently along each zone and having a set causing it to engage each of said members with resilient pressure, the threads of the respective parts coacting with a wedge-like action to eliminate backlash.

6. A magnetic-pull bearing comprising opposed magnetic units having narrow opposed annular faces forming a gap therein, one of said units including a permanent magnet, one of said units being stationarily supported and the other being carried by a rotatable element, a free-ended axially extending pin carried by one of the units, a stop member carried by the other of the units positioned to engage the pin and limit the approach of one of the faces toward the other, said pin and stop member each comprising a separate piece accurately positioned with respect to its associated gap face, and at least one of the units being positioned by a threaded device free from backlash and moving the unit less than .01 inch per revolution so that the pin and stop member may readily be moved into contact and then backed away for the desired clearance and the desired gap length, said threaded device being a differential screw mechanism as defined in claim 5.

7. A rotating element, electrical means operating inductively on said element and capable of electrically imparting jolts thereto, coacting bearing elements for rotatably mounting said element, one of which is spring-mounted and one of which is formed of malleable metal truly non-corrosive under service conditions, and magnetic means for counteracting gravity to provide a lighter than gravity load on said bearing elements, said rotating element having a defined weight quotient over 1.55.

8. A rotating element, electrical means operating inductively on said element and capable of electrically imparting jolts thereto, coacting bearing elements for rotatably mounting said element, one of which is spring-mounted, and magnetic means for counteracting gravity to provide a lighter than gravity load on said bearing elements, said rotating element having a defined weight quotient over 1.55.

9. A rotating element, electrical means operating inductively on said element and capable of electrically imparting jolts thereto, and coacting bearing elements for rotatably mounting said element, one of which is spring-mounted, said rotating element having a defined weight quotient over 1.55.

10. A magnetic-pull bearing comprising opposed magnetic units having opposed poles in axial alignment forming a gap therein, one of said units including a permanent magnet, a frame member, one of said units being of tubular shape and extending downwardly through said frame member and being stationarily supported thereby, the other of said units being carried by a rotatable element; said bearing including limiting means including a stop member carried by one of the units and a limiter carried by the other of the units, at least one of said stop member and limiter being non-magnetic, said stationarily supported unit including a fixed shell and a movable portion therewithin movable in an axial direction to engage the limiter and the stop, the gap between the poles being accurately predetermined when said limiter and stop are in engagement and being increased in accordance with movement of the limiter and stop from each other relatively, and a differentially threaded member engageable by a tool through the end of the shell, axially threaded to the shell and axially threaded with differential threads to the movable member so that after complete assembly of the bearing and the rotatable element the gap length and the clearance between the limiter and the stop may be simultaneously adjusted by turning the differential screw to move the limiter in engagement with the stop and then turning it in the opposite direction a predetermined amount to provide the desired clearance and the desired gap length.

11. A magnetic-pull bearing comprising opposed magnetic units having narrow opposed annular faces forming a gap therein, one of said units including a permanent magnet, one of said units being stationarily supported and the other being carried by a rotatable element, a free-ended axially extending pin carried by one of the units, a stop member carried by the other of the units positioned to engage the pin and limit the approach of one of the faces toward the other, and at least one of the units being positioned by a threaded device free from backlash and moving the unit less than .01 inch per revolution so that the pin and stop member may readily be moved into contact and then backed away for the desired clearance and the desired gap length, said threaded device being a differential screw mechanism as defined in claim 5.

References Cited in the file of this patent

UNITED STATES PATENTS

| Number | Name | Date |
|---|---|---|
| 48,120 | Warner | June 6, 1865 |
| 260,366 | Burr | July 4, 1882 |
| 1,719,890 | Kinnard et al. | July 9, 1929 |
| 2,311,382 | Hansen | Feb. 16, 1943 |
| 2,333,647 | Green | Nov. 9, 1943 |
| 2,471,618 | Green | May 31, 1949 |

FOREIGN PATENTS

| Number | Country | Date |
|---|---|---|
| 122,508 | Australia | Oct. 31, 1946 |
| 256,359 | Great Britain | Aug. 12, 1926 |